United States Patent [19]

Staar

[11] 4,016,365

[45] Apr. 5, 1977

[54] READOUT FOR RECORDING TYPEWRITER

[75] Inventor: Marcel Jules Helene Staar, Brussels, Belgium

[73] Assignee: Staar Development Company, S.A., Brussels, Belgium

[22] Filed: Sept. 2, 1975

[21] Appl. No.: 609,580

Related U.S. Application Data

[63] Continuation of Ser. No. 593,217, July 7, 1975, abandoned.

[30] Foreign Application Priority Data

July 5, 1974 Belgium .............................. 817295

[52] U.S. Cl. ............................ 178/23 R; 178/17.5; 178/81; 197/1 R; 340/324 R

[51] Int. Cl.² .................. G06K 15/00; H04L 13/00

[58] Field of Search ............. 197/1 R; 340/324 AD; 178/17.5, 30, 81, 23 R; 35/6

[56] References Cited

UNITED STATES PATENTS

| | | | |
|---|---|---|---|
| 2,699,857 | 1/1955 | Wales, Jr. | 197/1 R |
| 3,659,283 | 4/1972 | Ophir | 340/324 AD |
| 3,868,672 | 2/1975 | Johnson | 340/324 AD |

OTHER PUBLICATIONS

"A Complete Interactive Terminal You Can Hold in One Hand", *Modern Data*, Apr. 1974, pp. 34–36.

German Design (Gebrauchsmuster) 7418471, May 28, 1974, Bergman et al., "Invoicing Machine . . .".

*Primary Examiner*—Thomas A. Robinson

*Attorney, Agent, or Firm*—Leydig, Voit, Osann, Mayer & Holt, Ltd.

[57] ABSTRACT

A recording typewriter of the type including a memory arranged to record codes corresponding to typed characters as they are typed, and to drive the typewriter to type characters corresponding to stored codes. A single line readout is provided, preferably positioned between the typewriter keyboard and roller so as to be easily accessible to the view of an operator. The readout displays a selected line of characters as recorded in the memory. The particular line to be displayed is selected in dependence upon the typewriter elements associated with line control, such as the position or change of position of the typewriter roller or the actuation of the carriage return control. The system provides an economical and effective means of accessing stored data, allowing correction of stored documents, for example, to be easily accomplished.

16 Claims, 10 Drawing Figures

FIG. 4
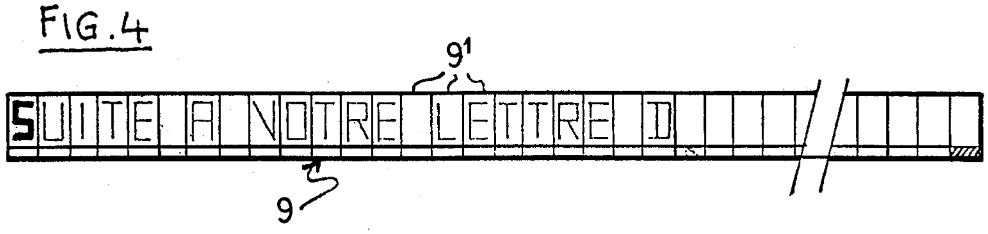
FIG. 5
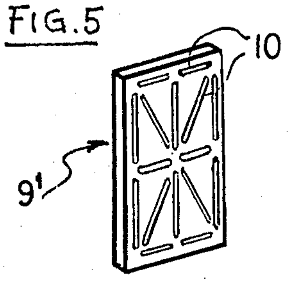
FIG. 5A
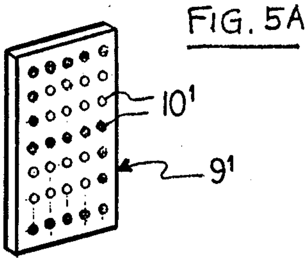
FIG. 6A
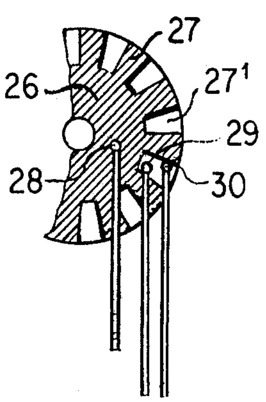
FIG. 6
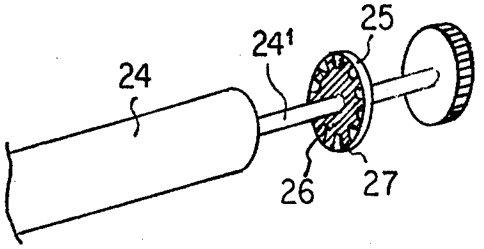
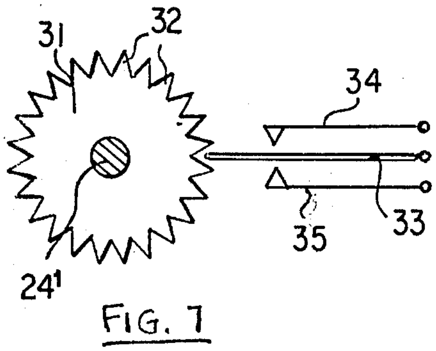
FIG. 7
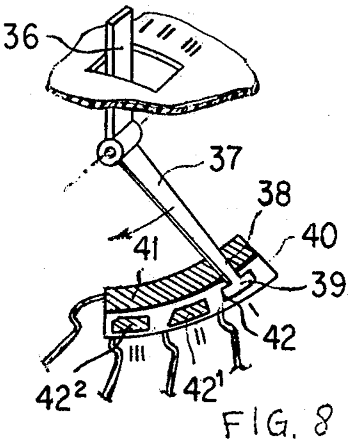
FIG. 8

READOUT FOR RECORDING TYPEWRITER

This application is a continuation of my prior application Ser. No. 593,217, filed July 7, 1975, now abandoned.

This invention relates to recording typewriters, and more particularly to such typewriters having means for displaying the stored information.

Automatic typing machines are known, such typing machines including memories for storing codes corresponding to typed characters, and adapted to drive the typing mechanism to reproduce the stored information. The units are adapted to allow corrections and modifications to be made to the stored information, so that after corrections are made, and a new sheet of paper inserted, the machine may automatically type back a perfectly corrected text.

In such machine, when making corrections or modifications to the stored text, it is necessary to be able to access particular portions of such text to effect changes. In general, for this purpose, control knobs are provided by which the user, by taking the beginning of the text as a reference, may jump from paragraph to paragraph, from line to line, or from character to character to arrive at a location where a change is desired. Such a system is not only inconvenient to use, but it is rather time consuming, and prone to errors in that the user does not know, for certain, which position in the memory is being accessed.

CRT displays have been associated with automatic typewriters to overcome such difficulties. In such systems, the CRT may be adapted to display an entire page of text to allow the operator visual access to the text to be changed and its location. However, such CRT displays are generally very costly. Additionally, due to their size, they are generally positioned in a way which makes it impossible for the operator to see both the keyboard, the typed text and the display of text in the memory.

In view of the foregoing, it is an aim of the present invention to provide a recording typewriter including a single line readout responsive to stored data for displaying a line of type, and including selecting means responsive to the typewriter itself for selecting the particular line to be displayed.

According to a more detailed aspect of the invention, it is an object to provide such a memory readout system adapted for operator convenience whereby the single line readout is positioned between the keyboard and typewriter roller so as to be within the general view of the operator.

These and other objects are accomplished according to the present invention by providing a recording typewriter of the foregoing type including a display, preferably alpha numeric, having a plurality of character positions sufficient to display a complete line of type. Means are provided for coupling the memory to the display, such means being responsive to the codes stored within the memory for displaying the characters corresponding to a selected line of type. Selecting means are provided for selecting the particular line of type to be displayed. Such means are responsive to the elements of the typewriter itself, allowing simpified selection of a desired portion of text in memory. To enhance ease of use, the readout is constructed in a single line format and positioned on the typewriter between the keys and the paper roller, thus making it easily accessible to the view of the operator.

The invention, as well as other objects, advantages and features, will be better understood from the following detailed description when taken in conjunction with the drawings, in which:

FIG. 4 is a view of a single line readout adapter for use in the system of FIG. 2;

FIGS. 5 and 5A illustrate alternative readout elements usable in the readout of FIG. 4;

FIGS. 6 and 6A illustrate switch means for monitoring the position or change of position of the roller of the typewriter of FIG. 2;

FIG. 7 is an alternative arrangement of the switch means of FIG. 6; and

FIG. 8 illustrates a switching arrangement adapted to detect single, double or triple spacing.

While the invention will be described in connection with certain preferred embodiments, it will be understood that there is no intent to limit it to those embodiments. On the contrary, the intent is to cover all alternatives, modifications and equivalents included within the spirit and scope of the invention as defined by the appended claims.

Figure 1:
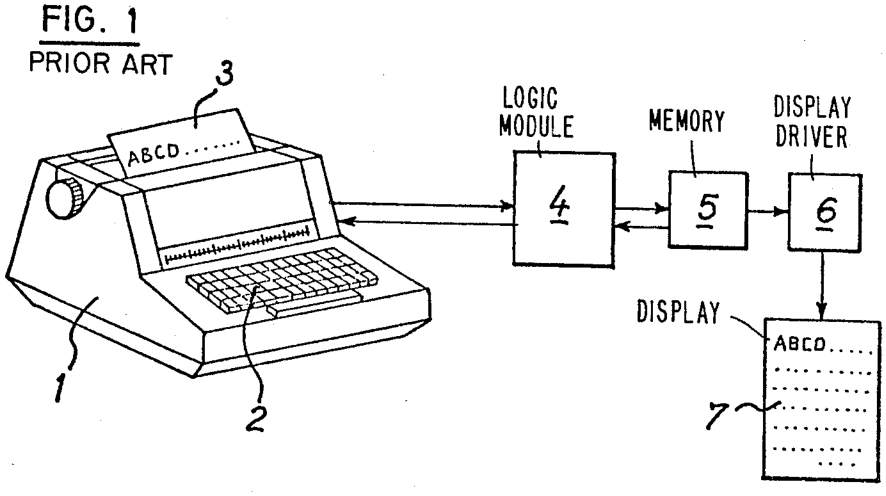
FIG. 1 PRIOR ART
FIG. 1 is a schematic illustration of a prior art typewriter including display.

Turning now to FIG. 1, there is shown a prior art recording typing system including a typewriter 1 having a keyboard 2 and showing a sheet of paper 3 positioned in the typewriter. An electronic logic module 4 is coupled to the typewriter for receiving codes corresponding to keys depressed by an operator. The logic module 4 receives these codes from the typing unit and transmits them in the order received to an electronic memory 5 for storage. The stored information may be displayed to an operator, being decoded by a logic unit 6 which serves to drive a display device 7, which may take the form of a CRT display. The logic module 6 serves to extract the codes and produce signals for driving the CRT in conjunction with the raster scan of the electron beam across the face of the CRT so as to display the text corresponding to the codes stored in the memory 5.

The typing system of FIG. 1 is also operable in the automatic typing mode whereby the logic module 4 serves to extract stored codes from the memory 5 and drive the typing unit within the typewriter 1 in accordance therewith. In this mode, the stored information automatically drives the typewriter in what may be considered an inverse operation to the recording mode described above.

Figure 2:
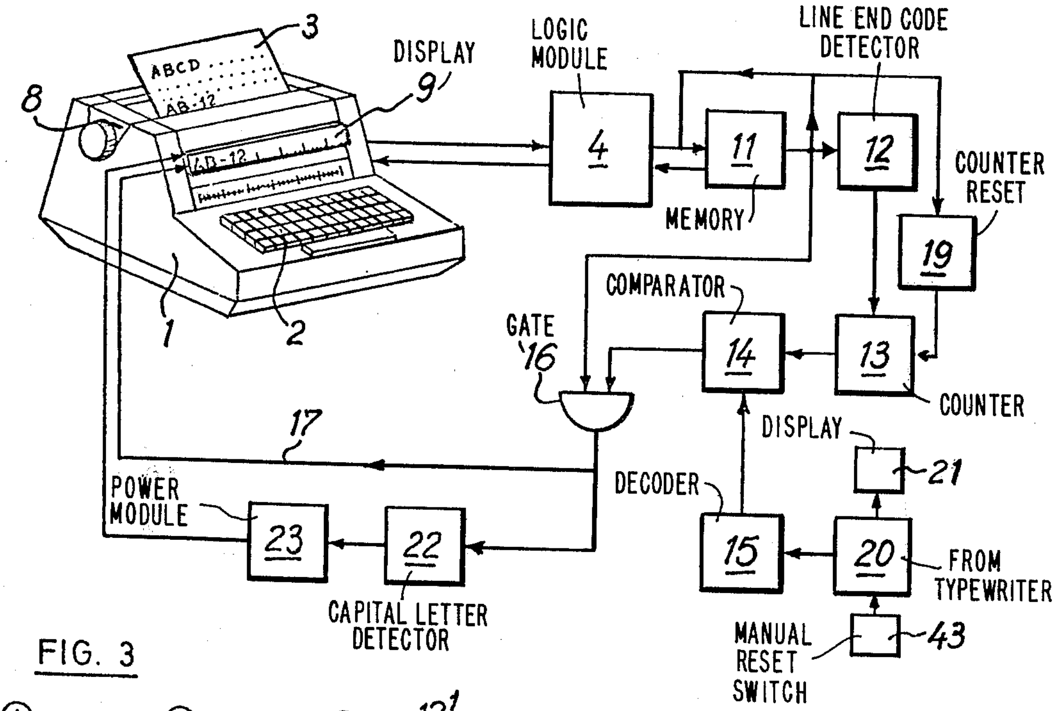
FIG. 2 is a schematic illustration of a recording typewriter having a single line readout and exemplifying the present invention.

Turning now to FIG. 2, there is shown a typing system exemplifying the present invention including a typewriter 1 similar to that described above having a keyboard 2 and a sheet of paper 3 positioned in the typewriter carriage. An electronic logic module 4 operates similarly to that described above to provide stored codes to a memory 11 in response to actuation of the typewriter keys, and in the playback mode to extract codes from the memory 11 and drive the typing unit within the typewriter 1.

In accordance with the invention, a display screen 9 is provided, preferably being positioned on the typewriter between the keyboard 2 and the carriage 8 so as to be within the immediate view of an operator when viewing the typed text and keyboard. Accordingly, the operator may easily follow the changes being made without the necessity of averting his view to observe a separate readout screen. In order to accomplish this, the readout is made in a flat configuration, preferably one typed line in length. The readout is illustrated in more detail in FIG. 4, showing the display of a selected line of type stored within the memory 11. In forming a readout of this configuration, dot matrix LED elements may be used as illustrated in FIG. 5A. Alternatively, liquid crystal elements or gas discharge readouts, such as those of the 16 bar type illustrated in FIG. 5, may be used. In a well known manner, the individual elements of the readouts of FIGS. 5 and 5A may be selectively illuminated to form alphabetical, numeric, or other graphic characters. The readout 9 of FIG. 4 is made up of a plurality of such elements $9^1$, FIG. 4 showing the selective illumination of the various elements to form a readable display.

Figure 3:
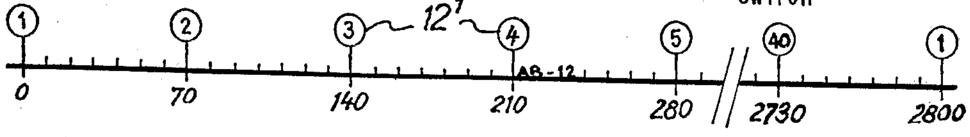
FIG. 3 is a diagram illustrating the structure of the memory element of the system of FIG. 2.

Referring again to FIG. 2, the memory element 11 has its output coupled to its input, being formed as a dynamic memory, continuously circulating for purposes which will be described below. FIG. 3 illustrates the structure of a typical memory, having 2800 positions, thereby being adapted to store 2800 codes corresponding to characters or functions within the repertoire of the typewriter 1. At every 70th position in the illustration of FIG. 3, there is illustrated a code $12^1$, corresponding to an end of line or carriage return code. While FIG. 3 illustrates this code at every 70th position, it will be realized that in normal operation the end of line or carriage return code will be found at irregular intervals, being dependent upon the particular text being typed.

A detector 12 is coupled to the output of memory 11, and is adapted to detect the end of line or carriage return codes. Each time such a code is detected, the detector 12 provides a signal to a counter 13, which thereby indicates the identity of the line presently being accessed or scanned in the memory 11. For keeping the counter 13 synchronized with the memory 11, a zero memory position detector 19 is coupled to the output of the memory 11 and is adapted to reset the counter 13 each time the memory 11 recycles to a zero position. The counter 13 couples such indication to a comparator 14, which in turn has its output coupled to a gate 16. The comparator 14 has a second input coupled to a decoder 15 which is in turn coupled to a second counter 20, these elements forming a part of the mechanism for selecting the particular line within the memory to be displayed. When the line number provided by decoder 15 corresponds to that stored within the counter 13, the comparator 14 produces a signal indicating such matched condition. In response thereto, the gate 16 is satisfied allowing the information produced at the output of the memory 11 to pass through the gate 16 to the display 9. Accordingly, the stored information drives the display to display the selected line. After the selected line is displayed, the end of line signal at the end of that line increments the counter 13, thereby providing a mismatched condition to the comparator 14 and dissatisfying the gate 16 thereby to prevent further information from being transmitted therethrough. Because the memory 11 continuously circulates at a high rate of speed, the gate 16 will be satisfied each time the selected line is accessed, such occurrence taking place many times every second. Because of this high rate of scanning, the retina persistence of the display, or an electronic delay built into the display circuitry, may be advantageously used to cause the displayed text to appear steady and continuous. As an example, in the illustration of FIG. 2, the memory line associated with line 4 on the text is selected, causing the display of the characters associated with the codes stored in such line.

In practicing the invention, means are provided for discriminating between upper case and lower case letters in the display 9. A capital letter detector 22 is coupled to the output of gate 16 and adapted to detect the presence of capital letters within the codes coupled from the memory to the readout. In the illustrated example, the capital letter detector acts upon a power module 23 for powering the display 9, causing a change in power during the time upper case letters are read out, for example, causing the upper case letters to be displayed more brillantly than the lower case. Alternatively, the module 23 may be adapted to blink the upper case letters at a relatively low rate, causing a perceptible blinking to occur in upper case letters. Other discrimination techniques are also available, such as underlining upper case letters. Finally, a display such as that illustrated in FIG. 5A may be driven to make the upper case letters larger than the lower case letters.

Turning again to the means for selecting the particular line within the memory to be displayed, it is recalled that the counter 20 provides an output signal operative upon the comparator 14 for selecting such line. The counter 20 is made responsive to the typewriter 1 itself, providing the operator an easy means for selecting of a line for display. For example, the counter 20 may be made responsive to a switch associated with the paper feed roller of the typewriter, rotating such roller in the forward or backward direction serving to select associated lines stored in the memory 11 for display. The counter 20, however, could also be made responsive to other line control elements within the typewriter, such as the carriage return control. One form of display line selector is illustrated in FIGS. 6 and 6A, showing a roller position detector adapted to sense the direction and amount of change in the position of the roller and to produce a signal corresponding thereto. Such signal is coupled to the counter 20 for causing the same to select the desired line for display.

Referring to FIGS. 6 and 6A in detail, there is seen the roller 24, which is part of the carriage 8 and upon which the paper sheet 3 is carried. Positioned upon shaft 24*1* is a disk 25 made of electrically insulative material, and covered on one side by a copper or other conductive sheet 26. The sheet 26 is arranged with toothed portions 27 of a form and spacing corresponding to the detented steps of the roller 24. A common brush 28 rides upon the inner portion of the disk 26, while a pair of displaced brushes 29 and 30 are adapted to engage the toothed portions 27. The slight displacement of the brushes 29, 30 with respect to each other allow the direction of rotation to be sensed, one or the other of the brushes arriving at or leaving the conductive portion of the disk sooner than the other in dependence upon the direction of rotation. The signals thus produced are coupled to the counter 20 which takes the form of an up/down counter, preferably adapted to count up when the paper roller is advanced and down when the roller is retarded. Thus, each time a new tooth on the disk 26 is encountered, the counter 20 is stepped to select the proper line for display.

FIG. 7 illustrates an alternate form of roller position detector including a toothed wheel 31 fixed on the shaft $24^1$ of the roller 24. The notches 32 in the wheel 31 are spaced to correspond to the detented forward and reverse stepping of the paper roller. A leaf spring 33 engages the toothed wheel 32, and is placed in operative relation to opposed contacts 34 and 35. The leaf spring 33 is conductive and forms one member of a switch associated with the aforementiond contacts. It is seen that rotation of the wheel 31 in the clockwise direction will serve to momentarily close contacts 35, once for each tooth or increment of rotation. Similarly, rotation of the wheel 31 in the counterclockwise direction will momentarily close contacts 34. The signals produced by the contacts are coupled to the up/down counter 20 as described above.

It will be apparent that the roller position detectors illustrated above are adapted to select a new line for display independently of whether the roller is turned manually, or advanced automatically such as by the carriage return operation of the typewriter. Thus, the counter 20 remembers the particular line selected, and the comparator 14 serves to couple that line to the display each time the memory 11 cycles to the section of memory storing the selected line.

It is also apparent that line selection could be accomplished by elements other than the conductive switching arrangements illustrated. For example, electric, magnetic, and optic switching arrangements are well known, and capable of performing equivalent functions.

As a further feature of the invention, a small display 21 may be provided for displaying the number of the line selected for display.

In order to accommodate typewriters having selectable line spacing, means may be provided for coupling the line spacing selector to the roller position detector. For example, FIG. 8 shows a selector 36 adapted to select single, double or triple spacing. The single space position corresponds to one tooth 32 on disk 31 (or one tooth 27 on disk 26), the double space position two teeth, etc. If, for example, triple spacing were selected, the passage of three teeth of the wheel 32 signals the selection of the following sequential line in the memory 11. In order to produce a signal relating to single, double or triple spacing, the lever 36 is provided with an extension 37 having a brush 38 arranged to slidably contact a conductive segment 41 positioned on an insulating spacer 40. The insulating spacer 40 also carries conductive segments 42, $42^1$ and $42^2$. Electrical power is coupled to the disk 41. When the lever 36 is in the single space position, power is coupled from the disk 41 to the segment 42 indicating to the system that each tooth advanced is operative to select the next line of type for display. When the lever 36 is moved to the double spacing position, power is coupled to segment $42^1$, indicating that two teeth must be advanced to select the next line. Similarly, in the triple space position, power is coupled to segment $42^2$ indicating that three teeth must be advanced to select the next line.

In order to reset the up/down counter 20 for selecting the first line of text, a manual switch 43 is provided. Depression of such switch resets the counter 20, thereby to select the first line of text. However, it will be apparent that the position of the counter 20 may be matched to the first or any other line of text by other functions of the typewriter keyboard.

The relative ease of operation of the illustrated system will be appreciated with reference to a brief description of operation in one possible mode of use. Assuming that the memory 11 is loaded with codes corresponding to a previously typed document, a marked up version of the document may be inserted in the carriage and the roller rotated to position line 1 in typing position. The switch 43 may be depressed to select the corresponding line for display on the display 9. The operator then has both the typed line and the stored line in his immediate view and may easily make any additions or modifications. Simply rotating the roller serves to advance both the sheet of text and the corresponding line on the display 9, allowing immediate access to the particular portions in memory at which the text is stored. It should also be noted that in certain cases the original text may be discarded, the writer having a direct visual contact of the text he is treating by way of his ability to sequentially access the lines stored in the memory 11.

I claim as my invention:

1. In a recording typewriter having a keyboard, line control elements including a roller for carrying a sheet to be typed and adapted to be advanced or retarded for bringing a line into type position, a recording memory, and means coupling the memory and the typewriter for recording codes in the memory corresponding to multiple lines of typed characters and for typing characters corresponding to stored codes, the improvement comprising, an alpha numeric display having a plurality of character positions sufficient to display a complete line of type, means coupling the memory to the display and responsive to the stored codes for displaying the characters corresponding to a selected line of type, line selecting means operatively connected to the output of the recording memory for selecting a particular line of type to be displayed from multiple lines stored in the recording memory, said line selecting means further including reset means for selecting the first line of a multiple line text stored in the recording memory and for displaying said first line, and means connecting said line selecting means for operation responsive to said line control elements within the typewriter for varying the display line-by-line coincident with varying the position of the roller and sheet thereon.

2. The typewriter as set forth in claim 1 wherein the alpha numeric display is arranged as a single line of characters and is positioned between the keyboard and the roller so as to be easily accessible to the view of an operator.

3. The typewriter as set forth in claim 2 wherein the display is a single line LED readout.

4. The typewriter as set forth in claim 2 wherein the display is a single line liquid crystal readout.

5. The typewriter as set forth in claim 1 wherein said means connecting said line selecting means for operation responsive to said line control elements within the typewriter includes a line counter, means associated with the roller for detecting the direction and amount of roller movement, and means coupling said last mentioned means with said counter for incrementing and decrementing said counter in response to roller movement.

6. The typewriter as set forth in claim 5 including resetting means associated with said counter included in said means for selecting the first line stored in the recording memory for display.

7. The typewriter as set forth in claim 1 including means operative upon the display for differentiating between upper case and lower case characters.

8. The typewriter as set forth in claim 7 including a power supply for said display, said differentiating means being operative upon said power supply for differentiating in brightness between upper case and lower case characters.

9. The typewriter as set forth in claim 7 wherein said differentiating means serves to blink the display of upper case characters.

10. The typewriter as set forth in claim 1 wherein said memory is a constantly circulating dynamic memory and including memory counter means associated with said memory and having an output indicating the number of the line which is currently being accessed in said memory, a comparator having a first input coupled to said counter memory, said comparator having a second input coupled to said line selecting means and adapted to provide an output signal when the signals on said first and second inputs coincide, and means responsive to said output signal for displaying the selected line.

11. The typewriter as set forth in claim 1 wherein said memory means includes a circulating dynamic memory, and memory counter means for indicating which of the lines stored in said memory is currently being accessed, said typewriter including comparator means coupled to said memory counter means and said line selecting means, said comparator serving to couple said memory to said display when the line selected by said line selecting means is being accessed in said memory, thereby to display the selected line.

12. The typewriter as set forth in claim 1 wherein said means connecting said line selecting means for operation responsive to said line control elements within the typewriter includes switch means associated with said roller, said switch means being responsive to roller rotation to indicate the direction and amount of roller rotation, and up/down counter means responsive to said switch means and providing an output signal indicating the selected line.

13. The typewriter as set forth in claim 12 further including a display to indicate the number of the selected line.

14. The typewriter as set forth in claim 12 wherein said switch means includes a conductive disc and brush means adapted to sense the direction and amount of roller rotation.

15. The typewriter as set forth in claim 12 wherein said switch means includes a toothed wheel, a leaf spring associated with said toothed wheel, first and second contacts associated with said leaf spring whereby rotation of said wheel in a first direction serves to intermittently close said first contacts and rotation of said wheel roller in the opposite direction serves to intermittently close said second contacts.

16. The typewriter as set forth in claim 1 further including means for detecting and storing end of line codes in the memory, a single-multiple line spacer, a spacing detector associated with said line control elements, and means operative by said spacing detector when said line spacer is set for multiple line spacing to signal said line selecting means to transmit to said display the following sequential line stored in the memory responsive to said end of line codes stored in the memory.

* * * * *